UNITED STATES PATENT OFFICE.

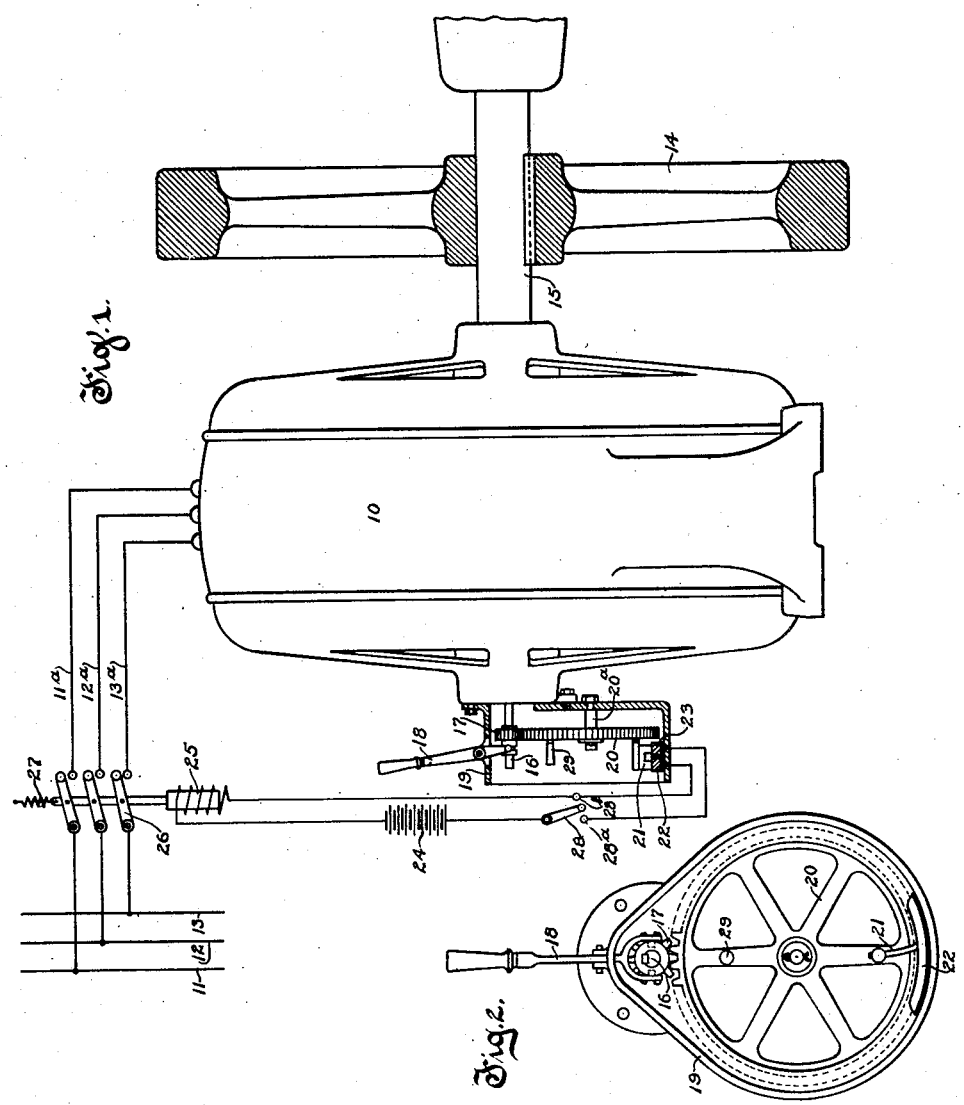

ALEXANDER M. GRAY, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

SYSTEM OF MOTOR CONTROL.

1,199,004. Specification of Letters Patent. Patented Sept. 19, 1916.

Application filed September 24, 1910. Serial No. 583,686.

*To all whom it may concern:*

Be it known that I, ALEXANDER M. GRAY, a subject of the King of England, residing at Milwaukee, in the county of Milwaukee and State of Wisconsin, have invented certain new and useful Improvements in Systems of Motor Control, of which the following is a full, clear, and exact specification.

My invention relates to motors, and more particularly to means for starting induction motors having rotating members of considerable inertia.

In many electrical systems it is necessary that the rotating mass have considerable inertia, as, for instance, in fly-wheel balancer systems where a motor driving a flywheel is connected across the circuit to maintain the load on the generator supplying such circuit constant. In starting a motor having such a rotating member, a very large current is required for a considerable period of time, and as the speed of the motor during such time is low, and the ventilation therefore poor, the motor will heat excessively and the insulation is apt to be destroyed.

It is the object of my invention to obtain a simple and reliable arrangement for starting a motor having a rotating member of considerable inertia. In attaining this object a device is used by which the motor is started and allowed to accelerate until its temperature has reached the maximum permissible value, after which it is allowed to coast and thereby cool itself. A cycle of this kind is repeated until the heavy rotating member has attained approximately the desired speed. In the arrangement illustrated, the motor is of the squirrel cage induction type, but other types of motors may be used.

The various novel features of my invention will be described in the specification, illustrated in the drawings, and particularly set forth in the appended claims.

Figure 1 of the drawings shows semi-diagrammatically one embodiment of my invention; and, Fig. 2 shows an end view of the switch-actuating device.

The motor 10, here shown as a squirrel cage induction motor, has a rotating member of large inertia, and is connected across the circuit 11—12—13 by the leads $11^a$, $12^a$, and $13^a$. In the arrangement shown the large inertia is obtained by means of a flywheel 14 mounted on the motor shaft 15. Extending from the end of the shaft 15 is a pin 16 having a gear 17 slidably mounted thereon and capable of being moved longitudinally by a handle 18 pivoted on an inclosing casing 19. A gear 20, capable of being driven by the gear 17 and carrying a bridging contact 21, is mounted on a pin $20^a$ secured to the casing 19. The bridging contact 21 coöperates with two stationary arc-shaped contacts 22 and 23 mounted upon and insulated from the casing 19. In the leads $11^a$, $12^a$, and $13^a$ is a switch 26, which is normally biased to open position, as by a spring 27, but movable to closed position by a solenoid 25. The switch 26 may be of any desired type of anti-sparking switch, for instance, an oil switch, or a switch having blowout magnets, may be used. The solenoid 25 is connected to the contacts 22 and 23 and to a storage battery 24 so that it is energized when the bridging contact 21 engages the contacts 22 and 23. Included in the circuit of the storage battery 24 is a switch 28, which, if open, allows the switch 26 to be opened regardless of the position of the bridging contact 21.

When the motor 10 is at rest, the switches 26 and 28 are in the positions shown in Fig. 1. Before starting the motor 10, the gear 17, if in engagement with the gear 20, is moved to the left by means of the handle 18 and the bridging contact 21 is moved in a direction corresponding to that in which it is driven by the motor 10 until the bridging contact 21 engages the contacts 22 and 23. The handle 18 is now moved to the left to throw the gear 17 into mesh with the gear 20 and the motor 10 is ready to be started. By now moving the switch 28 into engagement with the contact $28^a$ the solenoid 25 is energized to close the switch 26. The motor 10 now starts slowly, and the bridging contact 21 is moved across the contacts 22 and 23 by means of the gear 20 driven by the motor through the gear 17.

The motor 10, because it is rotating very slowly, takes a great amount of current, and since, also because of the low speed, the ventilation is very poor, the motor tends to heat excessively. Just before the motor reaches its maximum permissible temperature, the bridging contact 21 leaves the stationary contacts 22 and 23 and breaks the circuit of the solenoid 25. The switch 26 is now opened by means of the spring 27, and the motor is allowed to coast and thereby cool itself. The switch 26 remains open until the motor 10, coasting, has brought the bridging contact 21 again into engagement with the contacts 22 and 23, when the solenoid 25 is again energized and the switch 26 again closed to complete the circuit of the motor 10. The motor now accelerates further, for during the time the motor was allowed to coast, very little speed was lost. By repeating the foregoing cycle a sufficient number of times, the motor 10 will, without excessive heating, accelerate the fly-wheel 14 to the required speed. When the motor 10 has reached the desired speed, the switch 28 is moved to the right into engagement with the contact 28$^b$ to close the circuit through the solenoid 25 independently of the contacts 21, 22, and 23, thereby allowing the switch 26 to remain permanently in a closed position. At the same time the handle 18 may be moved to the right to disengage the gear 17 from the gear 20.

Many modifications may be made in the precise form and arrangement shown and described, and I aim in my claims to cover all such modifications which do not involve a departure from the spirit and scope of my invention.

What I claim as new is:

1. In combination, an induction motor having a rotating member of large inertia, a switch in the supply circuit of said motor and which is normally biased to open position, means controlled by said motor for closing said switch, and means for rendering said first named means inoperative.

2. In combination, an induction motor having a rotating member of large inertia, a switch in the motor supply circuit, means controlled by said motor for closing and opening said switch, and means for rendering said first named means inoperative when said motor has gained the desired speed.

3. In combination, a motor having a shaft, a member of great inertia carried thereby, a switch for controlling the circuit of said motor, means controlled by the motor for operating said switch to open and closed positions during the acceleration of said motor, and means for rendering said first means inoperative.

4. In combination, a motor, a switch in the supply circuit of said motor normally biased to open position, means controlled by said motor for closing said switch, and means for rendering said first named means inoperative.

5. In combination, a motor, a switch in the motor supply circuit, means controlled by said motor for closing and opening said switch, and means for rendering said first named means inoperative when said motor has gained the desired speed.

6. In combination, a motor, a member of great inertia rotated thereby, a switch in the supply circuit of said motor, means controlled by said motor and operative to hold said switch closed and open for appreciable intervals of time during the acceleration of said motor from rest to normal operating speed, and means for rendering said first mentioned means ineffective for control purposes and permitting said switch to remain closed when said motor reaches normal operating speed.

7. In combination, an induction motor and a rotating member of great inertia directly connected thereto, a switch in the supply circuit of said motor, means for accelerating said motor from rest to normal operating speed comprising means for automatically closing and opening said switch to allow the motor to coast a portion of the time to cool the motor parts, and means for rendering said first mentioned means ineffective for control purposes and permitting said switch to remain closed during normal operation of said motor.

8. In combination, a motor having a rotating member of great inertia, means for accelerating said rotating member from rest to normal operating speed comprising a switch in the motor supply circuit, means operative by said motor to hold said switch in closed and open positions for appreciable intervals of time, and means effective to hold said switch closed when said motor is operating at normal speed.

9. In combination, a motor having a rotating member of great inertia, means for accelerating said rotating member from rest to normal operating speed comprising a controlling device in the motor supply circuit, and automatic means for operating said device to interrupt the flow of current to the motor at intervals during such acceleration to avoid undue heating of the motor parts.

10. In combination, an electric motor, means for decreasing and increasing the supply of energy to said motor, means controlled by said motor for causing periodic operation of said energy varying means during acceleration, and means for rendering said motor controlled means ineffective.

11. In combination, an electric motor, means for decreasing and increasing the supply of energy to said motor, means controlled by said motor for causing operation of said energy varying means during acceleration, and means for rendering said motor controlled means ineffective.

Milwaukee, Wis., Sept. 20, 1910.

In testimony whereof I affix my signature, in the presence of two witnesses.

ALEXANDER M. GRAY.

Witnesses:
JOHN L. JOHNSON,
CHAS. L. BYRON.